W. E. BEMAN.

ROW-LOCK.

No. 7,281. Reissued Aug. 29, 1876.

Witnesses:

S. N. Piper

L. R. Moller

Inventor:

William E. Beman by his attorney.

R. H. Eddy

N. PETERS, PHOTO-LITHOGRAPHER, WASHINGTON, D. C.

UNITED STATES PATENT OFFICE.

WILLIAM E. BEMAN, OF CAPE ELIZABETH, MAINE, ASSIGNOR TO FRANK E. DAVIS, OF GLOUCESTER, MASSACHUSETTS.

IMPROVEMENT IN ROWLOCKS.

Specification forming part of Letters Patent No. 91,817, dated June 29, 1869; reissue No. 7,281, dated August 29, 1876; application filed June 28, 1876.

*To all whom it may concern:*

Be it known that I, WILLIAM E. BEMAN, of Cape Elizabeth, of the county of Cumberland and State of Maine, have made a new and useful invention having reference to Rowlocks, or Oar-Locks; and do hereby declare the same to be fully described in the following specification, and represented in the accompanying drawings, of which—

Figure 1:
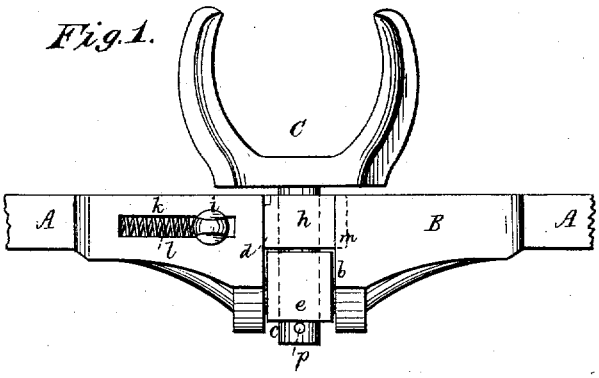
Figure 2:
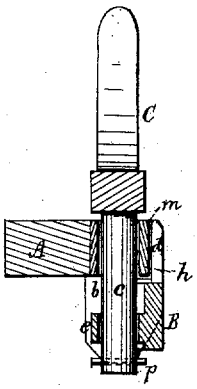
Figure 3:
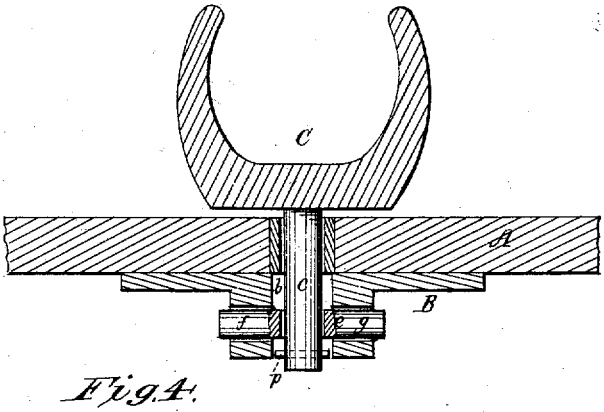
Figure 4:
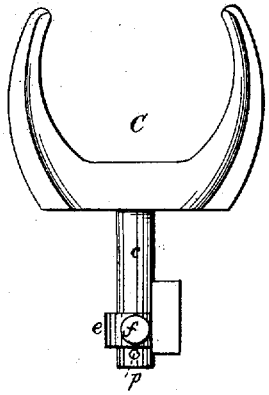

Figure 1 is a front elevation, Fig. 2 a transverse section, Fig. 3, a longitudinal section, of a rowlock provided with my invention. Fig. 4 is a view of the rowlock with its pivotal collar.

The principal object of the invention is to enable the rowlock to be dropped or turned down below the gunwale of the boat.

The nature of my invention consists, first, in the rowlock-supporter, provided with a spindle-socket, open in front to enable the rowlock to be turned or dropped down below the upper surface of the said supporter, or the gunwale of the boat, to which it may be fixed; second, in the rowlock-supporter provided with the spindle-socket, open in front, in combination with the rowlock having its spindle applied or pivoted to the supporter, so as to be capable of being revolved thereon, and of being dropped or turned down below the upper surface of the supporter or the gunwale when applied thereto; third, in the combination of a slide-bolt with the rowlock-supporter, provided with the rowlock spindle-socket, open in front, as described, the bolt being to slide across the opening; fourth, in the combination of a slide-bolt with the rowlock-supporter, provided with the spindle-socket, open in front, and with a rowlock, so pivoted to the supporter as to be capable of being revolved thereon, and of being dropped or turned down below its top, or that of the gunwale, to which said supporter may be fixed, all being essentially as specified.

In the drawings, A denotes the gunwale or rail of a boat, to which is fixed the rowlock-supporter B, which is provided with a vertical socket, *b*, to receive the shank *c* of the rowlock C. This socket is open in front, or slotted, as shown at *d*.

The rowlock, formed as shown, is pivoted at the lower end of its shank in a collar, *e*, provided with journals *f g*, extended from it, as shown, which enter corresponding bearings in the lower part of the supporter, the whole being so as to admit of the rowlock being revolved horizontally, and of being turned or dropped below the supporter or its top, or that of the gunwale. A pin, P, extended through the shank of the supporter, and projecting therefrom, as shown, serves to keep the collar and shank in connection. Within the supporter, and so as to slide transversely across the opening *d*, is a bolt, *h*, provided with a knob, *i*, that extends through and out of a slot, *k*, arranged in the supporter, as shown, there being within the bolt-socket a helical spring, *l*, for throwing the bolt forward. The supporter is provided with a small niche, *m*, to receive the outer end of the bolt.

By drawing back the bolt far enough, the rowlock can be dropped or turned down on the inner side of the gunwale, the bolt, when the rowlock is in its higher position, serving to hold it in such.

I claim as my invention as follows:

1. The rowlock-supporter B, provided with a spindle-socket, *b*, open in front, to enable the rowlock to be turned or dropped down below the upper surface of the supporter or the gunwale A, to which it may be applied.

2. The rowlock-supporter B, provided with the spindle-socket, open in front, in combination with the rowlock C, having its spindle so applied or pivoted to the supporter as to be capable of being revolved therein, and of being dropped or turned down below the upper surface of the supporter or the gunwale to which it may be applied.

3. The combination of the slide-bolt *h* with the rowlock-supporter, provided with the spindle-socket, open in front, as described.

4. The combination of the slide-bolt *h* with the rowlock-supporter B, provided with the spindle-socket, open in front, and with the rowlock C, so pivoted to or applied to the supporter as to be capable of being revolved therein, and of being turned or dropped below its top, or that of the gunwale A, all being essentially as specified.

WILLIAM E. BEMAN.

Witnesses:

HERBERT G. BIGGS,
CHARLES E. CLIFFORD.